April 26, 1949. J. F. NAGEL 2,468,227
FLY TRAP
Filed June 25, 1946 3 Sheets-Sheet 1
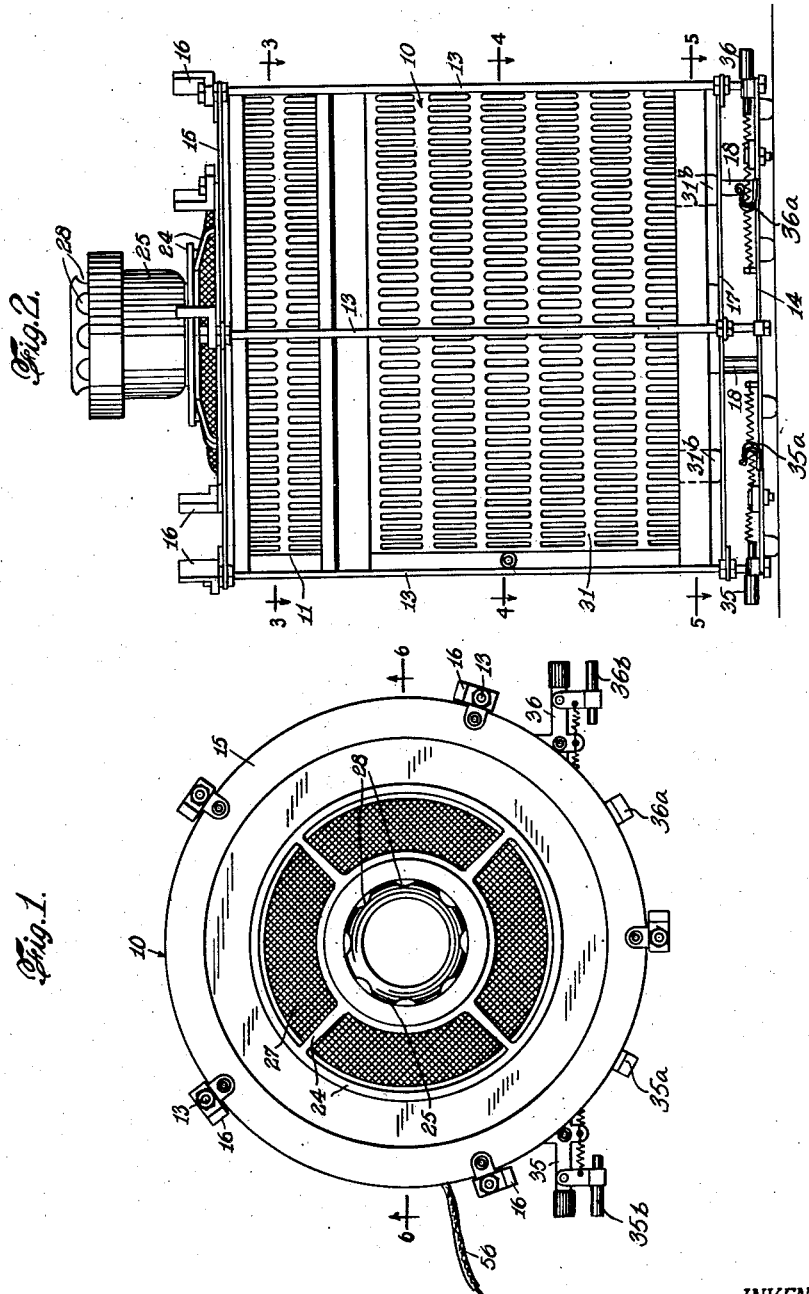
INVENTOR.
JACOB F. NAGEL
BY
ATTORNEY.

April 26, 1949.  J. F. NAGEL  2,468,227
FLY TRAP
Filed June 25, 1946  3 Sheets-Sheet 2
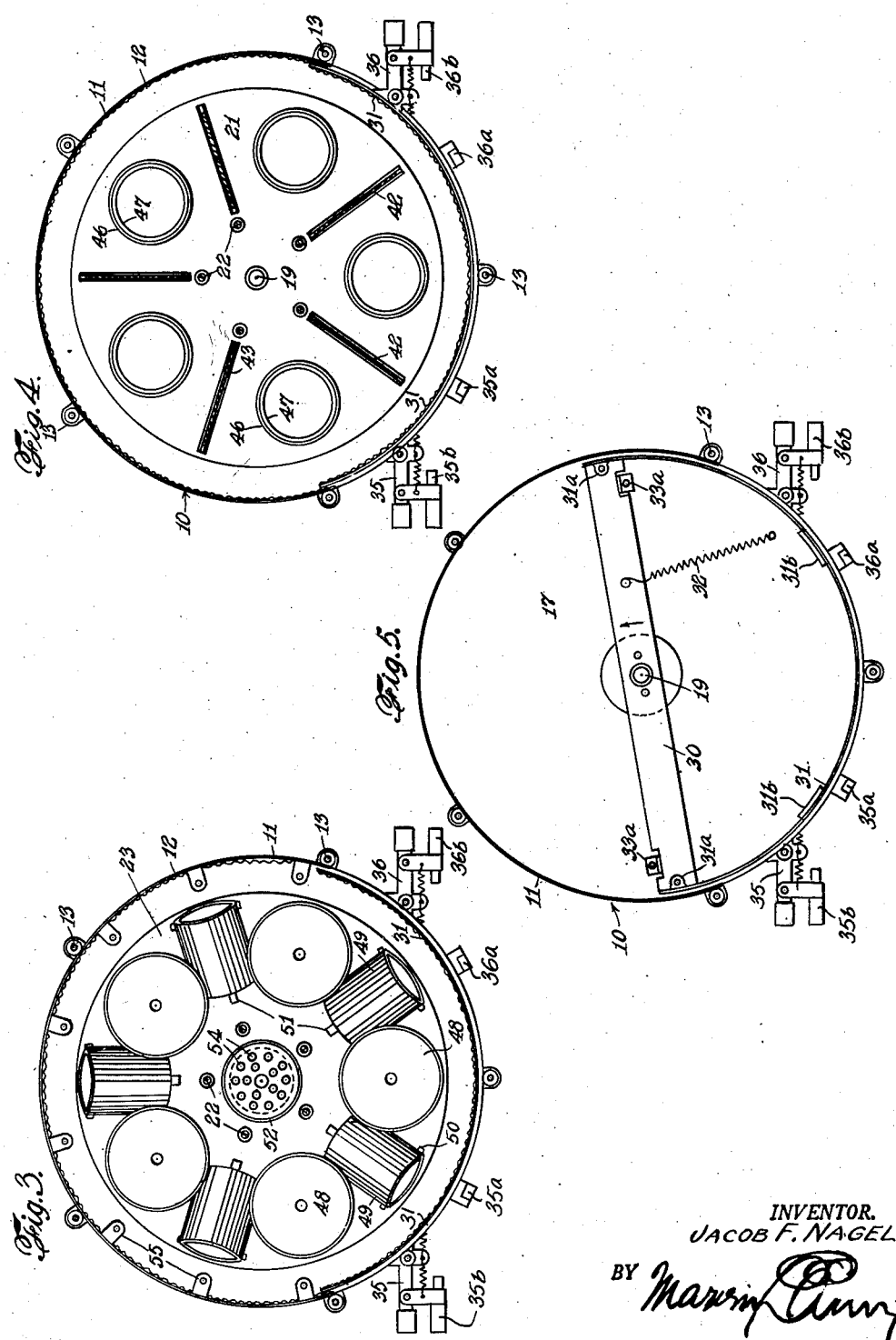
INVENTOR.
JACOB F. NAGEL
BY
ATTORNEY.

April 26, 1949.  J. F. NAGEL  2,468,227
FLY TRAP
Filed June 25, 1946  3 Sheets-Sheet 3
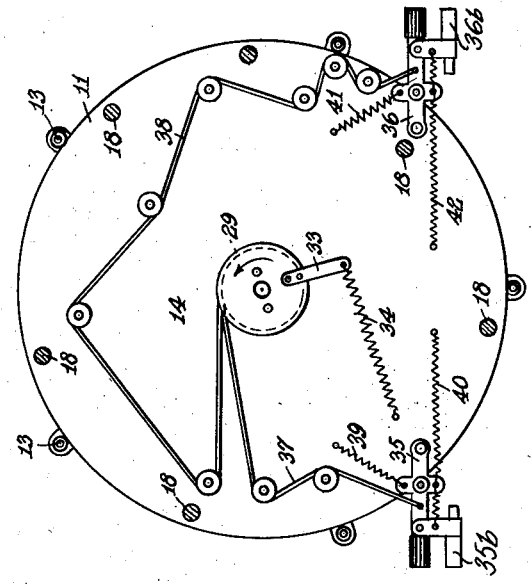
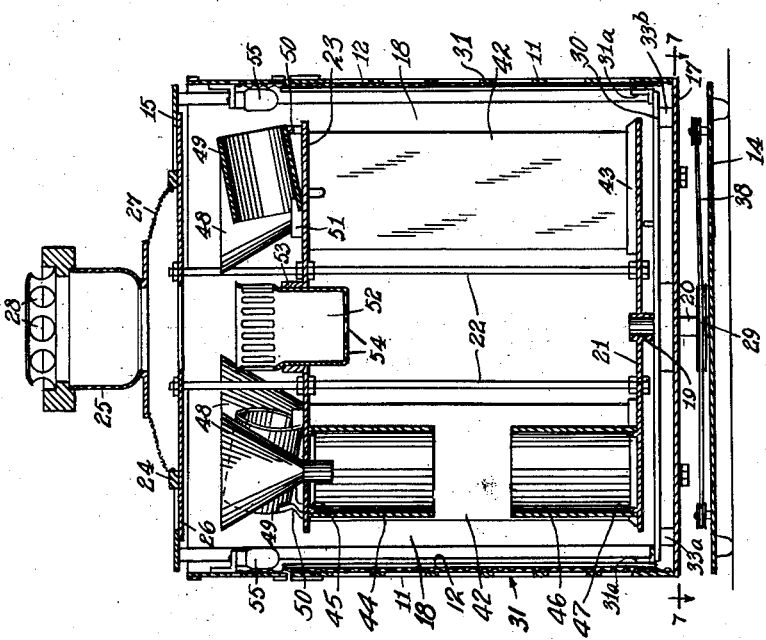
INVENTOR.
JACOB F. NAGEL
BY
ATTORNEY.

Patented Apr. 26, 1949

2,468,227

UNITED STATES PATENT OFFICE 2,468,227

FLYTRAP

Jacob F. Nagel, New York, N. Y.

Application June 25, 1946, Serial No. 679,210

5 Claims. (Cl. 43—113)

1

The present invention concerns a flytrap and refers more particularly to a device combining light and odor as means of attracting the fly, and screens and sticky substances as means of entrapping the fly.

An object of the present invention is to provide a flytrap of very great capacity.

A further object is the provision of a trap which will be easy to clean and recondition for further use.

Another object is to provide a trap of pleasing outward appearance and compact construction, so that it may be moved about readily and be acceptable in any surroundings.

In the drawings:

Figure 1 is a plan view of a device embodying the present invention.

Figure 2 is a side elevation of the same.

Figure 3 is a section on the line 3—3, of Figure 2.

Figure 4 is a section on the line 4—4 of Figure 2.

Figure 5 is a section on the line 5—5 of Figure 2.

Figure 6 is a section on the line 6—6 of Figure 1.

Figure 7 is a section on the line 7—7 of Figure 6.

Referring now in detail to the drawings, the trap 10 comprises a general cylindrical outer casing 11 of perforated metal immediately inside which is a foraminated lining member 12 of metal wire cloth or the like. The casing 11 is reinforced by girder members 13 extending vertically from top to bottom thereof, engaging a bottom plate 14 and an annular roof member 15. Angular members 16 are mounted on the top of each girder 13 and constitute convenient handles.

A floor member 17 is mounted by posts 18 upon the plate 14 beneath casing 11, and mounted in a bearing 19 on floor 17 is the shaft 20 on which turntable 21 is freely rotatable, as may be seen in Figure 6.

Girders 22 mounted on turntable 21 support a platform 23 and cupola base member 24 on which is mounted the cupola 25. A cupola skirt 26 is an annular member affixed to cupola base 24 and extending outwardly therefrom to beneath the annular roof member 15. Cupola base 24 is lined with wire cloth 27 or the like. Cupola 25 is a generally cylindrical member with a plurality of comparatively large holes 28 formed therein.

Fixed on shaft 20 are pulley wheel 29 and door arm 30 connected at both ends to the part cylindrical door 31 by brackets 31a and support on

2 floor 17 to slide on shoes 31b, and arm 30 is connected to floor 17 by extension spring 32. Arm 33 extends radially from pulley wheel 29 and is connected by extension spring 34 to bottom plate 14, stops 33a being provided on floor 17 to limit movement of said door.

Levers 35, 36 are pivoted on bottom plate 14 and connected by cables 37, 38 respectively to pulley wheel 29. Levers 35, 36 are further connected to bottom plate 14 by extension springs 39, 40, 41, 42. Action of the levers 35, 36 toward each other across the included arc of plate 14, best shown in Figure 7, causes pulley wheel 29 to rotate counterclockwise as indicated by the arrow in Figure 7, this actuating arm 30 and door 31 of Fig. 5 counter-clockwise to open the door and give access to turntable 21 and the interior of case 11 generally. Spring clips 35a, 36a are provided to engage pins 35b, 36b to retain the levers 35, 36 in position to hold the doors open. Upon release of levers 35, 36 door 31 will be closed by springs 32, 34, 39 and 41.

Extending radially of casing 11 are the vertical panels 42 situated between turntable 21 and platform 23 and radially slidable in channels 43 for the purpose of removal through door 31. Cylinders 44 removably and frictionally engage circular flanges 45 on the under side of platform 23 and cylinder 46 removably and frictionally engage circular flanges 47 on turntable 21. Funnels 48 lead from above platform 23 into each of the cylinders 44. Between funnels 48 are cylinders 49 with their axes disposed substantially radially of casing 11 and tilted upward at their outer ends by arcuate support members 50 while the cleats 51 serve to position the inner ends of said cylinders 49.

A substantially cylindrical cup 52 is removably positioned in flange 53 centrally of platform 23 and has its bottom formed with a plurality of holes 54. Electric lamps 55 fed by an electric lead 56 are positioned at spaced intervals within casing 11.

In operation, the lamps 55 are illuminated and the cylinders 44, 46, 49 and panels 42 are covered with some sticky substance having an odor attractive to flies, mosquitoes and other insects. The light and odor escape to the air about the trap through the many holes, perforations and foraminations above described and attract the insects, which enter the trap through apertures 28 in the cupola 25 and are immediately faced with a multiplicity of diversely extending and shaped surfaces and members coated with attractive substance such as syrup and honey. Once the insect has entered the trap, the many forms and parts of the surfaces about it are calculated to confuse it hopelessly so that in flitting about, the insect unavoidably touches the sticky substance and is stuck and will no longer trouble the housekeeper, camper or other users of the trap. When the insects have become numerous upon the parts within the trap toward the openings in the outer wall left open by door 31, the previously mentioned levers are operated to swing the door to a position in which the interior is accessible for clearing out the insects, the turntable being rotated to bring all parts of the apparatus mounted thereon into accessible position for such clearing operation.

The above mentioned cylinders and panels being removable may be flushed clean and used over.

As various possible embodiments might be made of the above invention, and as various changes may be made in the embodiments above set forth, it is to be understood that all matter herein set forth or shown in the accompanying drawings is to be interpreted as illustrative and not in a limiting sense.

What I claim is:

1. A flytrap comprising, in combination, an outer casing member, said member comprising a door member, a turntable located within said casing member, a platform supported from said turntable, and panels extending vertically between said platform and said turntable, said panels being removably mounted for removal through said door.

2. A flytrap comprising, in combination, an outer casing member, said member comprising a door member, a turntable located within said casing member, a platform supported from said turntable, and cylinders extending vertically between said platform and said turntable, said cylinders being removably mounted for removal through said door.

3. A flytrap comprising, in combination, an outer casing member, said member comprising a door member, a turntable located within said casing member, a platform supported from said turntable, panels extending substantially vertically between said platform and said turntable, and cylinders mounted on said platform and said turntable between said panels.

4. A flytrap comprising, in combination, an outer casing member, said member comprising a door member, a turntable located within said casing member, a platform supported from said turntable, panels extending substantially vertically between said platform and said turntable, and cylinders mounted on said platform and said turntable between said panels, said panels and cylinders being removably mounted and further being removable through said door.

5. A flytrap comprising in combination, an outer casing member, said member comprising a door member, a turntable located within said casing member, a platform supported from said turntable, panels extending substantially vertically between said platform and said turntable, cylinders being removably mounted and further being removable through said door, and illuminating means located within said casing, said casing being perforated for the escape of light therefrom.

JACOB F. NAGEL.

REFERENCES CITED

The following references are of record in the file of this patent:

UNITED STATES PATENTS

| Number | Name | Date |
| --- | --- | --- |
| 585,489 | Utter | June 29, 1879 |
| 1,337,560 | Kohn | Apr. 20, 1920 |
| 1,743,664 | Frost | Jan. 14, 1930 |